[118.]

JOEL T. CASE.

Improvement in Water Wheels.

No. 119,220.             Patented Sep. 26, 1871.

Witnesses.
C. A. Shepard.
Nettie Shepard.

Inventor.
Joel T. Case,
By James Shepard. Atty.

119,220

UNITED STATES PATENT OFFICE.

JOEL T. CASE, OF BRISTOL, CONNECTICUT, ASSIGNOR TO NATIONAL WATER-WHEEL COMPANY, OF SAME PLACE.

IMPROVEMENT IN WATER-WHEELS.

Specification forming part of Letters Patent No. 119,220, dated September 26, 1871.

*To all whom it may concern:*

Be it known that I, JOEL T. CASE, of Bristol, in the county of Hartford and State of Connecticut, have invented certain new and useful Improvements in Water-wheels, of which the following is a specification:

The first part of my invention relates to an improvement in the wheel-case patented to myself November 1, 1870, reissued March 11, 1871, being the subject-matter of Division B; and consists in the arrangement of a solid wall at the inner edge of the wheel-case and immediately in front of each group of chutes, as hereinafter described. The second part of my invention relates to the wheel, and consists in the employment of two disks, ogee-shaped toward their edges, and having buckets arranged between the ogee-shaped portion in the manner herein described.

Figure 1:
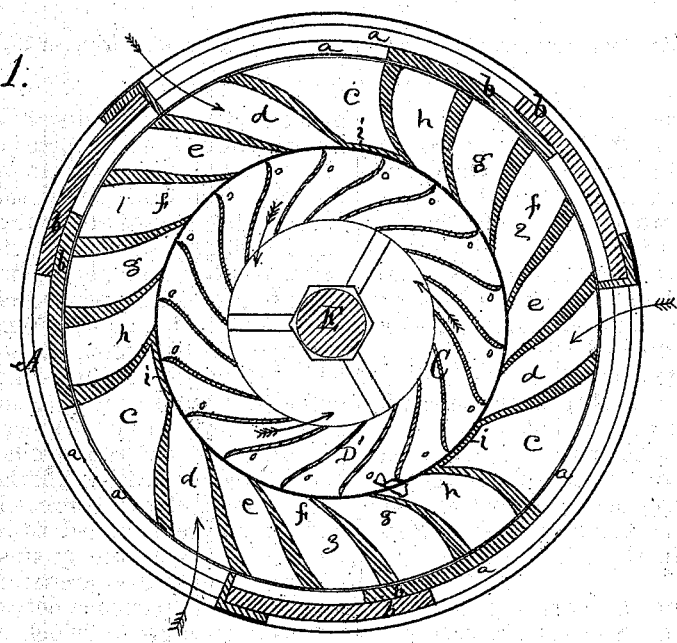
Figure 2:
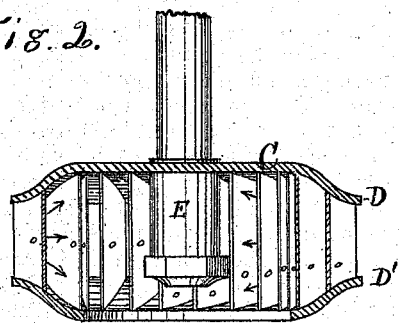

In the accompanying drawing, Figure 1 is a horizontal section of a wheel and its case embodying my invention, and Fig. 2 is a vertical and central section of the same wheel.

A designates a double-hoop gate, provided with openings $a$ and solid portions $b$, which gate, by proper mechanism, is rotated so as to bring its openings $a$ immediately in front of the chutes and its solid portions $b$ in front of the blank space $c$ in the wheel-case B, and vice versa, in order to open and close the gates, as fully described in the patent above referred to. The case B has three groups of chutes, 1 2 3, the individual chutes being designated $d\ e\ f\ g\ h$. By rotating the gate A more or less any number of chutes in each of the groups from $d$ to $h$ may be opened, as may be desired. Fig. 1 in the drawing represents the gate in the position it assumes when only the chutes $d\ d\ d$ are open. On the inside of the blank space $c$ is a solid wall, $i$, the same being circular and even with the edge of the wheel-case B and of a length fully equal to the space between the buckets $o$ of the wheel C designed to be used in said case.

In the operation of the gate A the chutes $d\ d\ d$ are first fully opened, as shown in Fig. 1, when the solid wall $i$ performs the office of confining the water in the buckets in front of said wall, which entirely prevents the water from escaping at the mouth of the buckets and into the unused or closed chutes until its force has been spent upon the buckets $o$ of the wheel C and the same set in motion. The direction of the water in passing through the chutes and buckets is indicated in the drawing by darts. The flow and force of the water passing through the first chute $d$ is sufficient to prevent the water that may be admitted to the succeeding chute $e$ from escaping from the mouth of the buckets $o$, and so on throughout the whole of the chutes in each group. Thus only one wall in front of each group of chutes is necessary to produce the desired result.

I am aware that walls similar to the wall $i$ have been placed between each of the chutes in a wheel-case, but such chutes were not divided into groups and they were arranged to be opened simultaneously; whereas the groups of chutes herein shown and described are arranged with a simple guide-curve or partition between the individual chutes in each group, which chutes are successively instead of simultaneously opened.

The wheel C consists of two disks, D D′, of ogee-form near their edge, slightly-curved buckets $o$ tangentially arranged between the ogee-shaped portion of said disks, and the shaft E. The tangential line of the buckets $o$ is such that when intersected by the tangential line of the inner end of the chutes the two tangents will form a V. Thus, the water, after passing through the chutes, will be turned about and forced backward in nearly an opposite direction. The central portion of the lower disk D′ is removed to allow the water to pass from the wheel. The disks D D′ are so placed that the greatest depth of the buckets $o$ is at their inner edge, as shown in Fig. 2. The object of placing the disks with their dishing sides toward each other, as shown, is to increase the capacity of the buckets for discharging the water therefrom, so that the greatest amount of water which can be admitted into the mouth of the bucket $o$ may, after exhausting its power by being turned backward in its course, be freely discharged from the wheel. The ogee-form of disk is believed to be the best form to accomplish this result, as the depth of the buckets increase with greater rapidity at the concave portion of the ogee (which is at the inner end of the buckets o) than it does at the mouth of the buckets between the convex portions of the ogee.

I claim as my invention—

1. The combination and arrangement, in the case B, of the solid wall $i$ and the groups of chutes 1 2 3, substantially as and for the purpose described.

2. The wheel C, formed of the buckets o and ogee-shaped disks D D', relatively arranged substantially as shown and described, and for the purposes set forth.

JOEL T. CASE.

Witnesses:
  CHAS. T. FOOTE,
  LYDIA E. FOOTE.